Patented Oct. 30, 1945

2,387,987

UNITED STATES PATENT OFFICE 2,387,987

NITRO SULPHATO AZO DYES

Friedrich Felix, Basel, Switzerland, and Werner Zürcher, deceased, late of Basel, Switzerland, by Josef Zürcher, administrator, Horgen, Switzerland, assignors to Society of Chemical Industry in Basle, Basel, Switzerland No Drawing. Application May 1, 1942, Serial No. 441,376. In Switzerland January 5, 1939

6 Claims. (Cl. 260—205)

It has been found that new azo-dyestuffs are obtained when monoazo-dyestuffs which are free from carboxylic and sulphonic groups and correspond to the general formula

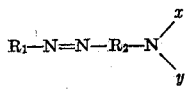

in which $R_1$ and $R_2$ represent aromatic nuclei of the benzene series and $x$ and $y$ represent members of the group consisting of hydrogen and alkyl radicals, at least one of these symbols $x$ and $y$ standing for a hydroxy-alkyl radical, and in which moreover the radical $R_1$ carries at least once a substituent capable of increasing the acidic properties of an aromatic hydroxyl group, preferably in a position different from the ortho-position to the —N=N— group, and in which the atomic grouping —N=N— stands in the para-position to the atomic grouping

are treated in the presence of sulphonating agents (i. e. sulphuric acid, chlorosulphonic acid or sulphuric acid containing $SO_3$) with nitrating agents. Substituents capable of increasing the acidic properties of an aromatic hydroxyl group are for example the nitro-group, halogens, the cyano-group, derivatives of carboxylic groups and sulphonic groups, such as for example $COOC_2H_5$, $COCH_3$, $CON(C_2H_5)_2$, $SO_2NH_2$, $SO_2N(CH_3)_2$, $SO_2CH_3$, $SO_2C_2H_5$-groups Of particular interest are those dyestuffs which are obtained when azo-dyestuffs in which the substituent capable of increasing the acidic properties of an aromatic hydroxyl group is a nitro-group or a halogen atom, are treated with the nitrating agents. Particularly good dyeing behavior is manifested by those dyestuffs which are obtained by nitrating those nitroamino-azo-benzene derivatives in which a nitro group stands in the nucleus $R_1$ in the 4- or 3-position in relation to the azo-group. The new products have been found to correspond in the free form to the general formula

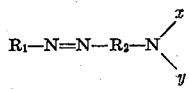

wherein $R_1$ and $R_2$ stand for nuclei of the benzene series and $x$ and $y$ stand for a member of the group consisting of hydrogen and alkyl radicals, at least one of the symbols $x$ and $y$ standing for the acid sulphuric acid ester of a hydroxyalkyl radical, wherein furthermore the radical $R_1$ contains in a position different from the ortho-position to the —N=N— group at least once a substituent which increases the acidic properties of an aromatic group, wherein the atomic groups —N=N— and

stand in para-position to one another, and wherein the radicals $R_2$ carries a nitro-group.

Among the dyestuffs suited for the process may be mentioned products such as 4-nitro-4'-β-hydroxyethyl-amino-1:1'-azobenzene, 4 - nitro - 4'-methyl-β-hydroxyethyl - amino-1:1'-azobenzene, 4-nitro-4'-di-β-hydroxyethyl - amino - 1:1'-azobenzene, 4-nitro-4'-methyl - β - dihydroxypropyl-amino-1:1'-azobenzene, 4 - nitro - 4'-butyl-β-hydroxyethyl - amino - 1:1'-azobenzene; further 4-nitro-4'-β-hydroxyethylamino - 5'-methyl - 1:1'-azobenzene, 4 - nitro-4'-ethyl - β - hydroxyethyl-amino-5'-methoxy-1:1'-azobenzene, 3 - nitro - 4'-β-hydroxyethylamino-1:1'-azobenzene, 3 - nitro - 4'-ethyl-β-hydroxyethylamino - 1:1'-azobenzene, 3-nitro-4'-ethyl - β - hydroxyethyl - amino - 5'-methyl-1:1'-azobenzene, 3 - nitro-4'- ethyl-β-hydroxyethylamino-5'-methoxy - 1:1' - azobenzene, 3-nitro-4'-methyl - β - hydroxyethylamino - 1:1'-azobenzene, 3 - nitro - 4'- β -hydroxyethyl-butyl - amino-1:1'-azobenzene, 2 - nitro - 4'-amino-4'-β-hydroxyethyl-amino-1:1'-azobenzene, 2-nitro-4'-methyl-β - hydroxyethylamino - 1:1'-azobenzene, 2-nitro-4'-β-hydroxyethylamino - 6'-chloro-1:1'-azobenzene, 4 - chloro - 4'-β-hydroxyethylamino-1:1'-azobenzene, 4 - bromo - 4'-β - hydroxyethyl-amino-1:1'-azobenzene, 3 - chloro - 4'- methyl-β-hydroxyethylamino-1:1'-azobenzene, 2-chloro-4'-butyl-β - hydroxyethylamino-1:1'-azobenzene, 4-sulphonmethyl - 4'-β - hydroxyethylamino - 1:1'-azobenzene, 2 - sulphonmethyl - 4'-methyl-β-hydroxyethylamino - 1:1'- azobenzene, 3 - sulphonic acid-4'-β-hydroxyethylamino - 1:1'- azobenzene, 4-sulphonic acid - 4'- methyl - β - hydroxyethylamino-1:1'- azobenzene, 2:5-dichloro-4'-methyl-β-hydroxyethylamino-1:1'- azobenzene, 4-bromo-4'-methyl - β - hydroxyethylamino - 1:1'-azobenzene, 2:5-dichloro - 4'-methyl - β - hydroxyethyl-amino-1:1'-azobenzene, 4 - nitro-2:6-dichloro-4'-methyl-β-hydroxyethylamino - 1:1'- azobenzene, 4-nitro-2:6-dichloro- or 2-chloro-6-bromo-4'-β- dihydroxyethylamino-1:1'-azobenzene, 4 - cyano-4' - β - hydroxyethylamino - 1:1' - azobenzene, 4-cyano-4'-methyl-β-hydroxyethylamino-1:1'-azobenzene, 4-carboxylic acid - ethylamido-4'-β-hydroxyethylamino - 1:1' - azobenzene. The alkyl group in N-hydroxyalkyl-alkylaminoazobenzenes may be substituted, for example by esterified or etherified hydroxyl groups, by cyanogen groups or by halogen atoms. For instance such compounds may be used as 3-nitro-4'-β-hydroxyethyl - methoxyethylamino - 1:1' - azobenzene, 3-nitro - 4'-β-β-hydroxyethyl-β-chloroethylamino-6'-methyl-1:1'- azobenzene, 4 - nitro - 4'- cyanoethyl-β-hydroxyethylamino - 1:1'- azobenzene, 4-nitro-4'-β-hydroxyethyl-β-chlorethylamino-1:1'-azobenzene, 3 - nitro-4'-chloromethyl-β-hydroxyethylamino-1:1'-azobenzene.

These dyestuffs are thus treated with nitrating agents in the presence of sulphuric acid or chlorosulphonic acid. Owing to the fact that the nitration is effected in the presence of sulphonating agents, the aliphatically bound OH-groups of the N-alkyl radical are esterified by the $O.SO_3H$-group. The new dyestuffs represent therefore the acid sulphuric acid esters of the dyestuffs of the general formula

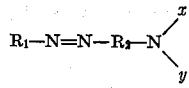

in which $R_1$ and $R_2$ represent aromatic nuclei of the benzene series, and $x$ and $y$ represent members of the group consisting of hydrogen and alkyl radicals, at least one of these symbols $x$ and $y$ standing for a hydroxy-alkyl radical, and in which moreover the radical $R_1$ carries at least once a substituent capable of increasing the acidic properties of an aromatic hydroxyl group, for example a nitro-group, preferably in a position different from the ortho-position to the —N=N— group, and in which the atomic grouping

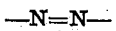

stands in the para-position to the atomic grouping

and in which the radical $R_2$ is substituted in most cases by a nitro group. Particularly valuable are those dyestuffs in which $x$ stands for the acid sulphuric acid ester of a hydroxyalkyl radical, for example a radical of the formula

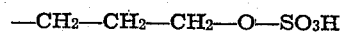

or of the formula $—CH_2—CH_2—O—SO_3H$, and in which $y$ stands for hydrogen or unsubstituted alkyl radicals.

Among the dyestuffs in which $x$ and $y$ have the above indicated meaning, those are again particularly valuable in which a halogen atom or still better a nitro group exists in the radical $R_1$ in a position which is different from the ortho-position to the radical —N=N—. In the form of their alkali salts, the new dyestuffs represent therefore water-soluble yellow to red and brown powders and dye acetate rayon from a neutral aqueous bath in shades of greenish yellow, yellow, orange, brown and red.

The new process permits, among other things, the manufacture of a series of water-soluble aminoazo-dyestuffs of a new type, which may be used, as mentioned above, to dye acetate rayon, particularly for the dyeing of yellow shades. In the field of the water-soluble dyestuffs for acetate rayon the new dyestuffs fill a perceivable gap, since such dyestuffs which meet the various requirements put nowadays to the soluble dyestuffs for acetate rayon—solubility, affinity, fastness to light and non-phototropic properties—have hitherto been very rare and even unknown. The new dyestuffs are also valuable for dyeing other products, for example fibers known by the registered trade-mark "Nylon."

The following examples illustrate the invention, the parts, unless otherwise stated, being by weight:

*Example 1*

2.9 parts of 3-nitro-4'-(β-hydroxyethyl)-amino-1:1'-azobenzene of the formula

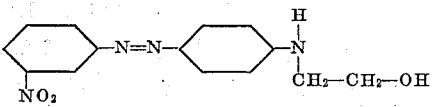

are dissolved by stirring with 30 parts by volume of concentrated sulphuric acid, and the solution is carefully mixed at —5° to 5° C. with 1.4 parts of a nitrating acid consisting of 0.7 part of nitric acid and 0.7 part of sulphuric acid. Stirring is continued, the temperature allowed to rise to 10° C. and the nitrating mass poured onto ice. There is obtained a viscous suspension of the nitrated sulphuric acid ester of 3-nitro-4'-(β-hydroxyethyl)-amino-1:1'-azobenzene, which is precipitated by addition of 20 per cent of sodium chloride (calculated on the volume). The precipitated dyestuff is filtered, stirred in about 1500 cc. of water and mixed with so much sodium carbonate solution of 10 per cent strength that Brilliant paper is just colored red. The solution formed is stirred with 20 per cent of sodium chloride (calculated on the volume of the solution), whereby the sodium salt of the nitrated sulfuric acid ester of 3-nitro-4'-(β-hydroxyethyl)-amino-1:1'-azobenzene is precipitated. When dry, the new dyestuff is a red brown powder.

The dyestuff of the formula

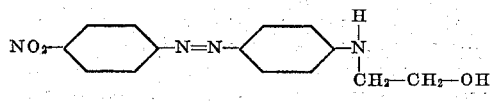

may be treated in similar manner in concentrated sulphuric acid with nitric acid. Further dyestuffs are obtained when treating in similar manner a dyestuff of the formula

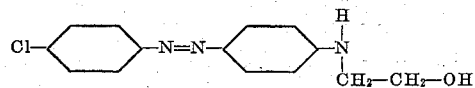

or

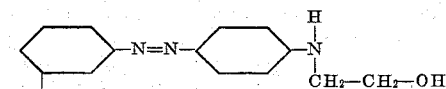

*Example 2*

31.4 parts of 3-nitro-4'-(ethyl-β-hydroxyethyl)-amino-1:1'-azobenzene of the formula

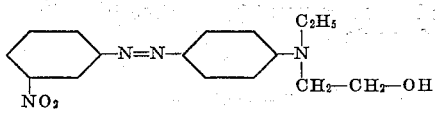

are dissolved at 0° C. in 350 parts by volume of concentrated sulphuric acid. 14 parts of a solution of 7 parts of nitric acid in 7 parts of sulphuric acid are added in drops at —5° to 5° C. Stirring is continued until the temperature has risen to 10° C. and the solution is poured on as little ice as possible. The precipitated dyestuff is filtered, stirred in about 1500 cc. of water and mixed with so much sodium carbonate solution of 10 per cent. strength that Brilliant paper is just colored red. The solution formed is stirred with 20 per cent. of sodium chloride (calculated on the volume of the solution), whereby the sodium salt of the nitrated sulphuric acid ester of 3-nitro-4'-(ethyl-β-hydroxyethyl)-amino-1:1'-azobenzene is precipitated. When dry, the new dyestuff is a dark powder which dissolves completely already in cold water to a brown solution.

Similar dyestuffs are obtained when treating, instead of the above named dyestuff, the dyestuff of the formula

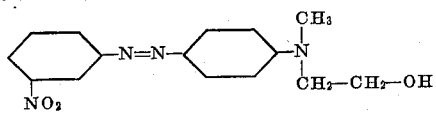

or the dyestuff of the formula

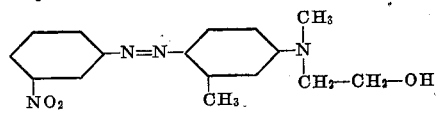

in concentrated sulphuric acid.

When dissolving the dyestuff of the formula

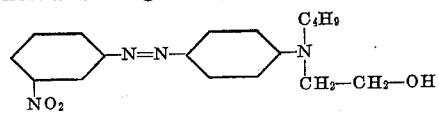

in concentrated sulphuric acid and treating it with nitric acid, there is obtained a product which dissolves in water to a red brown solution and dyes acetate rayon from an aqueous solution red brown shades. Instead of sulphuric acid there may also be used chlorosulphonic acid as solvent or as sulphonating agent.

*Example 3*

6.3 parts of 4-nitro-4'-(ethyl-β-hydroxyethyl)-amino-1:1'-azobenzene of the formula

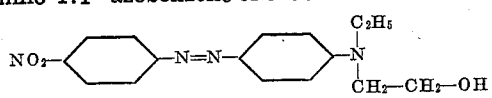

are dissolved in 65 parts by volume of sulphuric acid as described in Example 1 and nitrated with 2.8 parts of a mixed acid of equal parts of sulphuric acid and nitric acid. The nitration product which has been poured onto ice is mixed with so much saturated sodium carbonate solution that at the end Brilliant paper is slightly colored red. The sodium salt of the nitrated sulphuric acid ester of 4-nitro-4'-(ethyl-N-hydroxyethyl)-amino-1:1'-azobenzene which has precipitated, if necessary after addition of sodium chloride, is a dark powder when dry which dissolves completely already in cold water to a red solution.

In some cases a dyestuff may also be treated in a sulphuric acid containing $SO_3$, dissolved with nitric acid, or also with a salt thereof, for example potassium nitrate.

Thus the dyestuff of the formula

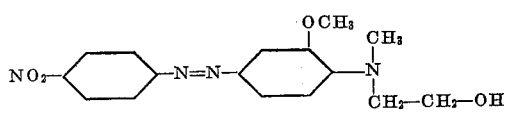

yields a brown red, when treated in sulphuric acid solution with potassium nitrate.

*Example 4*

0.5 part of the dyestuff described in the first paragraph of Example 1 is dissolved in 3000 parts of water. This dyebath is then mixed with 40 parts of crystallized sodium sulphate and 100 parts of acetate artificial silk yarn are handled therein for one hour at 80° C. After rinsing and drying, the artificial silk has a pure yellow tint.

Depending on the choice of dyestuff, acetate artificial silk can be dyed various tints.

The procedure is similar with the dyestuffs described in the other examples, brown and red shades, respectively, being obtained. Further yellow to brown, orange and red shades are also obtained with the dystuffs obtained by combining the components enumerated in the introduction.

This application is a continuation-in-part of application Serial No. 312,618, filed January 5, 1940.

What is claimed is:

1. A process for the manufacture of an azo-dyestuff, which comprises treating with a nitrating agent in presence of a sulphonating agent a monazo-dyestuff which is free from sulphonic and carboxylic groups and corresponds to the formula

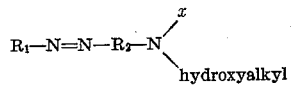

wherein $R_1$ and $R_2$ stand for nuclei of the benzene series, wherein $x$ stands for a member of the group consisting of hydrogen and an unsubstituted alkyl and wherein furthermore the radical $R_1$ contains in a position which is different from the ortho-position to the —N=N— group one nitro group, and wherein the atomic groupings —N=N— and

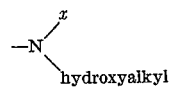

stand in para-position to one another.

2. A process for the manufacture of an azo-dyestuff, which comprises treating with a nitrating agent in presence of a sulphonating agent a monoazo-dyestuff of the formula

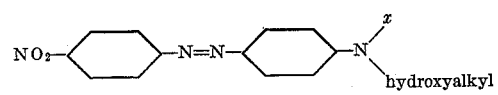

wherein $x$ stands for a member of the group consisting of hydrogen and unsubstituted alkyl.

3. A process for the manufacture of an azo-dyestuff, which comprises treating with a nitrating agent in presence of a sulphonating agent a monoazo-dyestuff of the formula

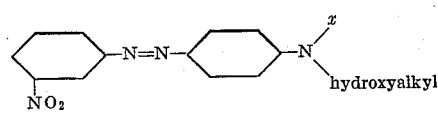

wherein $x$ stands for a member of the group consisting of hydrogen and unsubstituted alkyl.

4. The water-soluble products corresponding in the free form to the formula

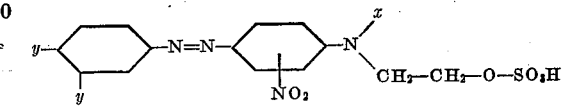

wherein one $y$ stands for a hydrogen atom and the other $y$ for a nitro group, and $x$ stands for a member of the group consisting of H, CH₃ and C₂H₅.

5. The water-soluble products corresponding in the free form to the formula

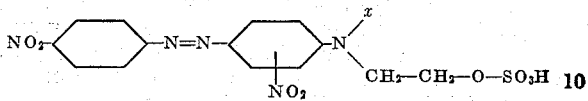

wherein $x$ stands for a member of the group consisting of H, CH₃ and C₂H₅.

6. The water-soluble products corresponding in the free form to the formula

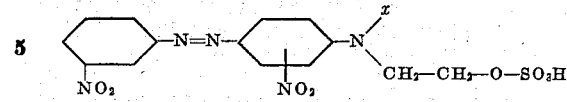

wherein $x$ stands for a member of the group consisting of H, CH₃ and C₂H₅.

FRIEDRICH FELIX.
JOSEF ZÜRCHER,
*Administrator of the Estate of Werner Zürcher, Deceased.*